United States Patent
Burd et al.

(10) Patent No.: US 10,815,796 B2
(45) Date of Patent: Oct. 27, 2020

(54) COATING PROCESS FOR GAS TURBINE ENGINE COMPONENT WITH COOLING HOLES

(71) Applicant: United Technologies Corporation, Hartford, CT (US)

(72) Inventors: Steven W. Burd, Cheshire, CT (US); Rickey P. Mercer, East Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 381 days.

(21) Appl. No.: 14/764,842

(22) PCT Filed: Jan. 30, 2013

(86) PCT No.: PCT/US2013/023840
§ 371 (c)(1),
(2) Date: Jul. 30, 2015

(87) PCT Pub. No.: WO2014/120152
PCT Pub. Date: Aug. 7, 2014

(65) Prior Publication Data
US 2015/0369059 A1    Dec. 24, 2015

(51) Int. Cl.
*F01D 5/18* (2006.01)
*F01D 5/00* (2006.01)
(Continued)

(52) U.S. Cl.
CPC ............. *F01D 5/288* (2013.01); *C23C 4/12* (2013.01); *C23C 4/18* (2013.01); *F01D 5/005* (2013.01);
(Continued)

(58) Field of Classification Search
CPC .......... F01D 5/288; F01D 5/005; F01D 5/186; C23C 4/12; C23C 4/18; B23P 2700/06;
(Continued)

(56) References Cited

U.S. PATENT DOCUMENTS 4,402,992 A * 9/1983 Liebert .................. C23C 4/134
427/243
5,392,515 A 2/1995 Auxier et al.
(Continued)

FOREIGN PATENT DOCUMENTS

GB    2 401 115 A  * 11/2004

OTHER PUBLICATIONS

Definition of "adjust, v.2" from Oxford English Dictionary, retreived from http://www.oed.com on Jul. 16, 2017, 6 pages.*
(Continued)

*Primary Examiner* — William P Fletcher, III
(74) *Attorney, Agent, or Firm* — Gatz Balich LLC

(57) ABSTRACT

A method of coating a component having a multiple of cooling holes including removing at least a portion of a prior coating from a component; mapping a location of each of the multiple of cooling holes to generate a map of cooling holes; applying a coat to the component; adjusting the map of cooling holes to account for said coat to generate a adjusted map of cooling holes; and re-drilling the multiple of cooling holes in response to the adjusted map of cooling holes.

1 Claim, 7 Drawing Sheets

(51) Int. Cl.
  *B05D 3/12* (2006.01)
  *F01D 5/28* (2006.01)
  *C23C 4/18* (2006.01)
  *C23C 4/12* (2016.01)
  *B05D 3/00* (2006.01)
  *B05D 7/14* (2006.01)

(52) U.S. Cl.
  CPC .............. *F01D 5/186* (2013.01); *B05D 3/002* (2013.01); *B05D 3/12* (2013.01); *B05D 7/14* (2013.01); *B23P 2700/06* (2013.01); *F05D 2260/202* (2013.01); *Y02T 50/676* (2013.01)

(58) Field of Classification Search
  CPC . Y02T 50/676; F05D 2260/202; B05D 3/002; B05D 3/12; B05D 7/14
  See application file for complete search history.

(56) References Cited

U.S. PATENT DOCUMENTS

| | | | |
|---|---|---|---|
| 5,422,167 A * | 6/1995 | Robertson | G09F 3/02 428/195.1 |
| 6,074,706 A | 6/2000 | Beverly et al. | |
| 6,210,488 B1 * | 4/2001 | Bruce | B08B 3/12 134/1 |
| 6,265,022 B1 | 7/2001 | Fernihough | |
| 6,365,013 B1 | 4/2002 | Beele | |
| 6,667,076 B2 | 12/2003 | Fried et al. | |
| 7,614,235 B2 | 11/2009 | Burd et al. | |
| 7,622,160 B2 | 11/2009 | Gupta et al. | |
| 7,631,502 B2 | 12/2009 | Burd et al. | |
| 7,985,188 B2 | 7/2011 | Felts et al. | |
| 8,192,831 B2 | 6/2012 | Rosenzweig et al. | |
| 9,760,986 B2 * | 9/2017 | Ramamurthy | G06K 9/6202 |
| 2003/0037436 A1 * | 2/2003 | Ducotey, Jr. | B23H 9/10 29/889.1 |
| 2003/0231955 A1 | 12/2003 | Barry et al. | |
| 2004/0134897 A1 | 7/2004 | Das et al. | |
| 2006/0157456 A1 | 7/2006 | Hoebel et al. | |
| 2008/0306714 A1 * | 12/2008 | Ferrarese | G06T 17/10 703/1 |
| 2009/0220349 A1 * | 9/2009 | Bolms | F01D 5/005 416/97 R |
| 2009/0270014 A1 | 10/2009 | Miller et al. | |
| 2009/0310869 A1 * | 12/2009 | Thiel | G06T 7/73 382/201 |
| 2010/0126014 A1 | 5/2010 | Gupta et al. | |
| 2012/0084981 A1 | 4/2012 | Arikawa et al. | |
| 2012/0179285 A1 * | 7/2012 | Melzer-Jokisch | B23P 6/007 700/164 |
| 2012/0281883 A1 * | 11/2012 | Hurley | G01N 21/6458 382/109 |
| 2013/0268107 A1 | 10/2013 | Bostanjoglo et al. | |
| 2014/0200440 A1 * | 7/2014 | Iannotti | A61B 5/061 600/424 |

OTHER PUBLICATIONS

Definition of "map, n.1" from Oxford English Dictionary, retreived from http://www.oed.com on Jul. 13, 2017, 13 pages.*
EP Search Report dated Mar. 29, 2016.

* cited by examiner

COATING PROCESS FOR GAS TURBINE ENGINE COMPONENT WITH COOLING HOLES

This application claims priority to PCT Patent Application No. PCT/US13/23840 filed Jan. 30, 2013, which is hereby incorporated by reference.

BACKGROUND

The present disclosure relates generally to a coating process for air-cooled components.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

Gas turbine engine hot section components such as blades and vanes are subject to high thermal loads for prolonged time periods. Other components also experience high thermal loads such as combustor, exhaust liner and nozzle components. Historically, such components have implemented various air-cooling arrangements within numerous cooling holes that permit the passage of air sourced from the compressor or fan section. In addition, the components are typically provided with various coatings such as a thermal barrier coating to further resist the thermal loads.

Over time, the coatings may wear. To restore these components to near-original capability, common repair practices involve stripping the coating with a water jet and re-performing the coating operation. These repairs are typically neither cost-effective nor operationally effective as the original cooling holes cannot be properly located due to recoat coverage within and over the cooling holes. This recoat coverage may result in a secondary complication in that the cooling holes cannot be readily located for restoration as re-drill operations may often result in misaligned or duplicate cooling holes.

SUMMARY

A method of coating a component according to one disclosed non-limiting embodiment of the present disclosure includes removing at least a portion of a prior coating from a component mapping a location of each of the multiple of cooling holes to generate a map of cooling holes; applying a coat to the component; adjusting the map of cooling holes to account for said coat to generate an adjusted map of cooling holes; and re-drilling the multiple of cooling holes in response to the adjusted map of cooling holes.

A further embodiment of the foregoing embodiment of the present disclosure includes generating the map of cooling holes from a backside of the component.

A further embodiment of any of the foregoing embodiments, of the present disclosure includes generating the map of cooling holes from a cold side of the component.

A further embodiment of any of the foregoing embodiments, of the present disclosure includes generating the map of cooling holes from a front side of the component.

A further embodiment of any of the foregoing embodiments, of the present disclosure includes generating the map of cooling holes from a hot side of the component.

A further embodiment of any of the foregoing embodiments, of the present disclosure includes removing all layers of a top coat of the prior coating.

A further embodiment of any of the foregoing embodiments, of the present disclosure includes removing all layers of a ceramic top coat of the prior coating.

A further embodiment of any of the foregoing embodiments, of the present disclosure includes removing at least one layer of a nickel alloy bond coat of the prior coating.

A further embodiment of any of the foregoing embodiments, of the present disclosure includes removing all layers of a ceramic top coat of the prior coating and at least one layer of the prior coating.

A further embodiment of any of the foregoing embodiments, of the present disclosure includes directing a gas through at least one of the multiple of cooling holes; and applying a coat while directing the gas through at least one of the multiple of cooling holes.

A further embodiment of any of the foregoing embodiments, of the present disclosure includes finish drilling the multiple of cooling holes.

A further embodiment of any of the foregoing embodiments, of the present disclosure includes cleaning the multiple of cooling holes.

A further embodiment of any of the foregoing embodiments, of the present disclosure includes dressing the multiple of cooling holes to obtain a desired flow quality.

A computer readable storage medium according to one disclosed non-limiting embodiment of the present disclosure includes an algorithm operable to adjust a map of cooling holes on a component to account for a coat and generate an adjusted map of cooling holes.

A further embodiment of the foregoing embodiment of the present disclosure includes wherein the map of cooling holes is from a hot side of the component of a gas turbine engine.

A further embodiment of the foregoing embodiment of the present disclosure includes wherein the map of cooling holes is from a cold side of the component of a gas turbine engine.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
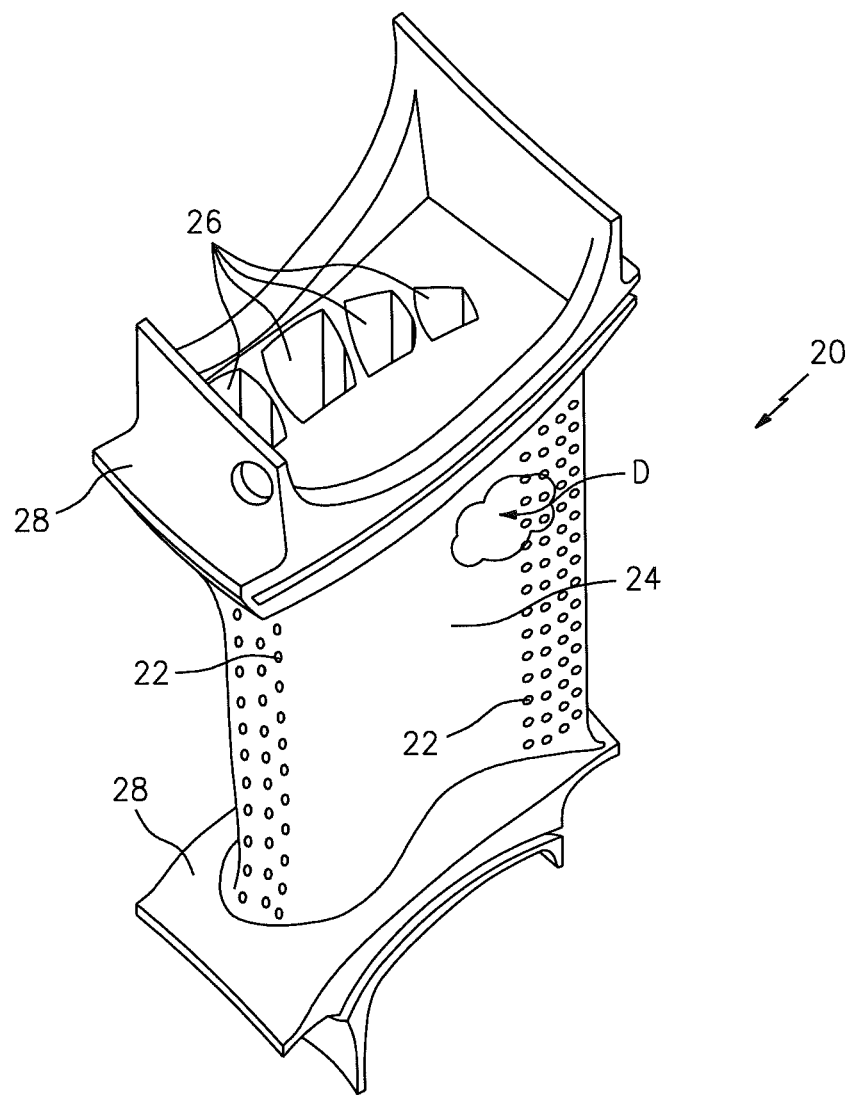
FIG. 1 is a general schematic view of an exemplary actively cooled component as a representative workpiece.

FIG. 1 schematically illustrates a general perspective view of an exemplary component 20, e.g., an actively cooled turbine stator segment of a gas turbine engine. It should be appreciated that although a particular component type is illustrated in the disclosed non-limiting embodiment, other components, such as blades, vanes, exhaust duct liners, nozzle flaps nozzle seals as well as other actively cooled components will also benefit herefrom. These components operate in challenging high-temperature environments such as a hot section of a gas turbine engine and have aggressive requirements in terms of durability and temperature allowances.

The stator 20 includes a multiple of cooling holes 22 in an airfoil section 24 that communicate with internal passageways 26 (shown schematically in phantom) that extend through the stator platforms 28. The cooling holes 22, film or effusion, may be formed with lasers, Electron Discharge Machining (EDM), water jet or other techniques and are typically approximately 0.020-0.125 inches (0.5-3.2 mm) in diameter and may be drilled normal or angled to the surface. Cooling air enters the internal passageways 26 of the component 20 through the internal passageways 26. The cooling holes 22, provide cooling to the exposed surface of the components to reduce temperatures and heat transfer. For example, the internal passageways 26 of the component 20 are cooled by convection while the outer surface is cooled through film cooling from air that exits the cooling holes 22.

Figure 2:
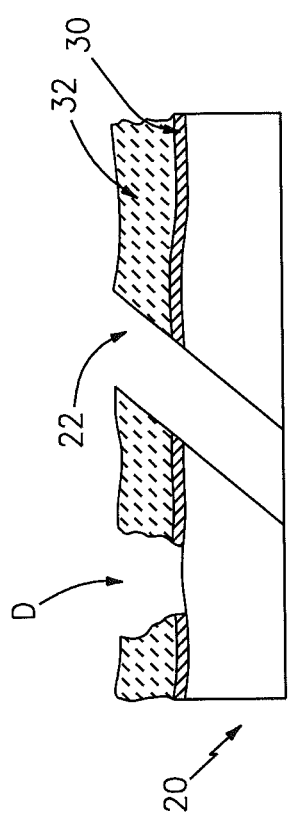
FIG. 2 is an expanded cross section of the actively cooled component.

Flow path surfaces such as the airfoil section 24 and the associated surfaces of the stator platforms 28 are coated to provide thermal barrier, environmental barriers and/or other capabilities required to survive in the high-temperature environment or to meet requirements. The coating may be a thermal barrier coating that includes a bond coat 30 and a top coat 32 (FIG. 2). The bond coat 30 in one disclosed non-limiting embodiment may be a nickel-based alloy material and the top coat 32 may be a ceramic material, each typically applied in layers via plasma spray coating system. The top coat 32 is typically thicker than the bond coat 30.

With reference to FIG. 2, the coating, over time, may become distressed in particular areas (illustrated schematically at D). The distressed areas D may include spallation or liberation of the coating—typically the top coat 32 flakes away from the bond coat 30.

Figure 4:
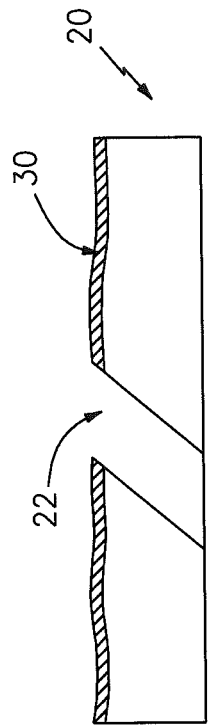
FIG. 4 is an expanded cross section of the actively cooled component representative of one step of the method of repairing an actively cooled component.
Figure 3:
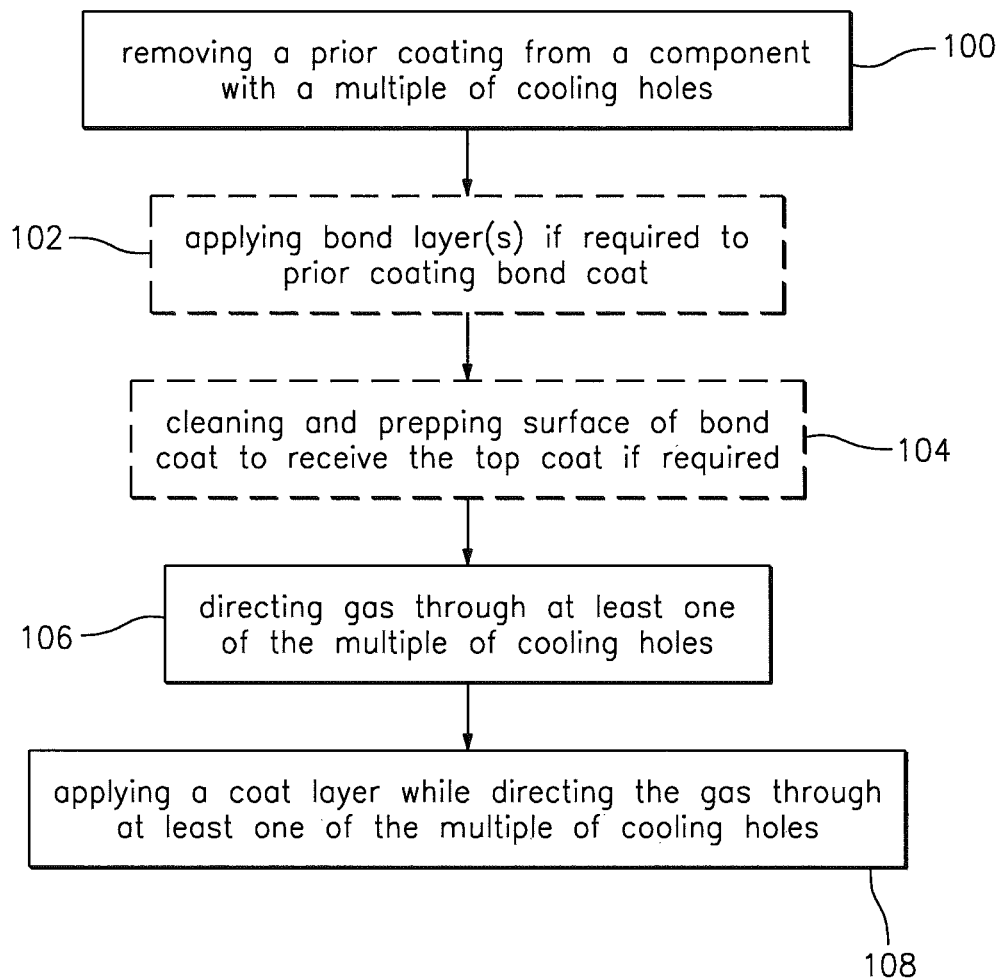
FIG. 3 is a flow diagram of a method of repairing an actively cooled component according to one disclosed non-liming embodiment.

With reference to FIG. 3, to restore the component 20 to near-original capability, an aftermarket repair method for the coating involves stripping the top coat 32 in the distressed areas D with a water jet, grit blast or other system (FIG. 4; Step 100). The top coat 32 and a portion of the bond coat 30 may be removed. That is, the top coat 32 and the bond coat 30 are typically applied in sprayed layers such that all layers of the top coat 32 are removed and one or more of the layers of bond coat 30 are removed in a repaired area. Alternatively, the entire top coat 32 is removed from the bond coat 30. Alternatively still, the top coat 32 and the bond coat 30 may be removed.

The removed layer(s) of bond coat 30 may then be reapplied if necessary to bring the thickness of the bond coat 30 to specification (Step 102). The bond coat 30 is relatively thin and reapplication thereof minimally effects, if at all, the multiple of cooling holes 22. The component 20 may then be cleaned and prepped if required to receive the top coat (Step 104).

The component 20 is then positioned to receive a gas such as air, nitrogen or other inert gas through at least one of the multiple of cooling holes 22 (Step 106). In one disclosed non-limiting embodiment, the gas is "shop air" at a pressure between 10-200 psi and more specifically at approximately 100 psi. "Shop air" as defined herein is air typically available in a manufacturing and repair environment. Other pressures, gases and fluids may alternatively be provided dependent on, for example, the coating and application system.

Figure 5:
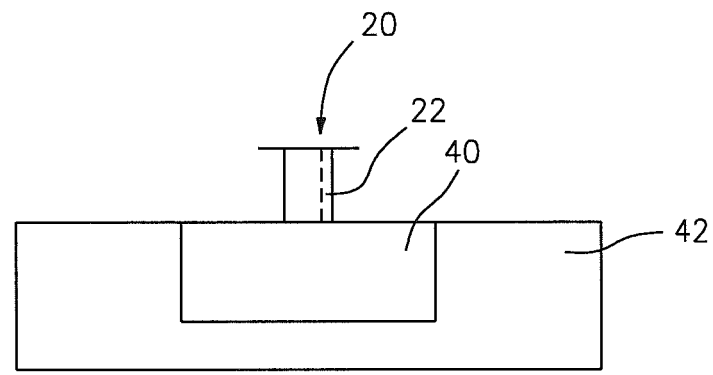
FIG. 5 is a schematic representation of one step of the method in which the component is positioned to receive a gas through at least one of the multiple of cooling holes during coating according to another disclosed non-liming embodiment.
Figure 6:
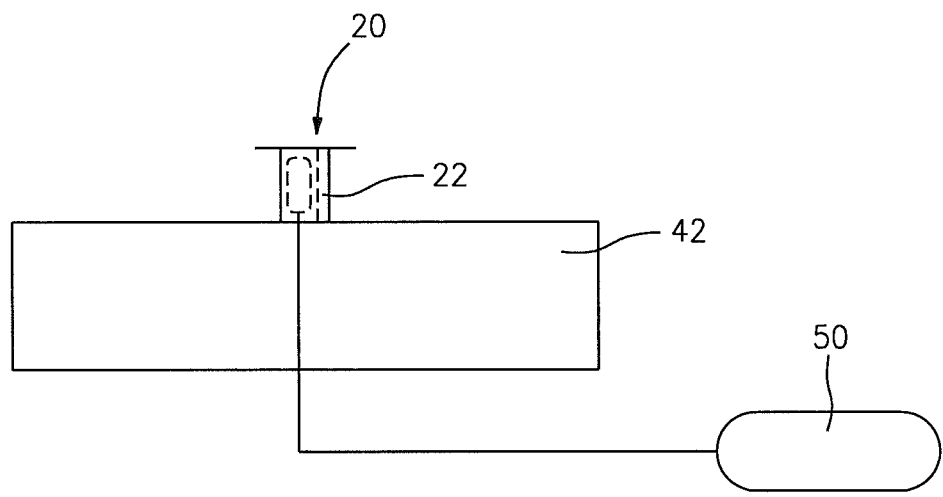
FIG. 6 is a schematic representation of one step of the method in which the component is positioned to receive a gas through at least one of the multiple of cooling holes during coating according to another disclosed non-liming embodiment.

In one disclosed non-limiting embodiment, the component 20 is affixed to a pressurized, sealed plenum 40 that mounted to a coating fixture 42 to permit flow from the uncoated surface of the component 20 and out through the cooling holes 22 (FIG. 5). In another disclosed non-limiting embodiment, the component 20 is connected to a bladder 50 in communication with the internal passageways 26 in the component 20 (FIG. 6). The bladder 50 is then pressurized to force gas flow through the cooling holes 22. It should be appreciated that other systems to force the gas through the cooling holes 22 may alternatively or additionally be provided.

Figure 8:
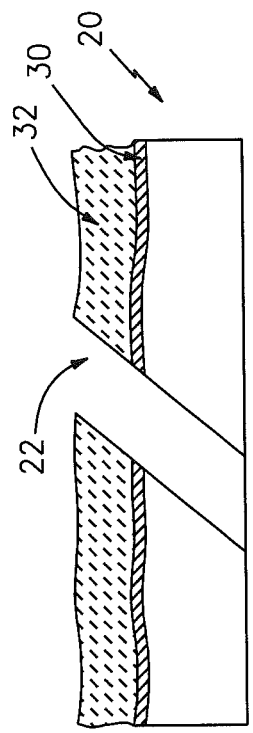
FIG. 8 is an expanded cross section of the actively cooled component representative of one step of the method of repairing an actively cooled component.
Figure 7:
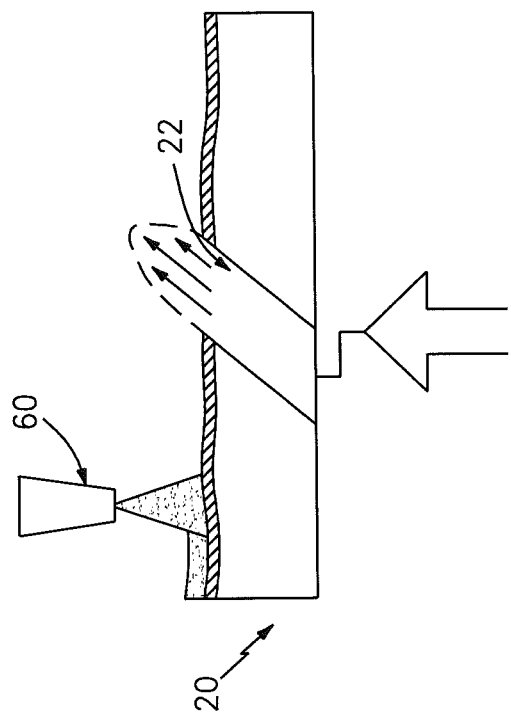
FIG. 7 is an expanded cross section of the actively cooled component representative of one step of the method of repairing an actively cooled component.

While the gas is directed through at least one of the multiple of cooling holes 22, the top coat 32 is reapplied with a spray system 60 (illustrated schematically; FIG. 7) such as, for example, a plasma spray system (step 108). The gas flow through the cooling holes 22 during coating application prevents or minimizes the adhesion of the coating in the air path from the cooling holes 22 due to the momentum of the gas and the quenching nature of the gas interaction with the coating to form the cooling hole 22 in an ablative manner (FIG. 8).

Figure 9:
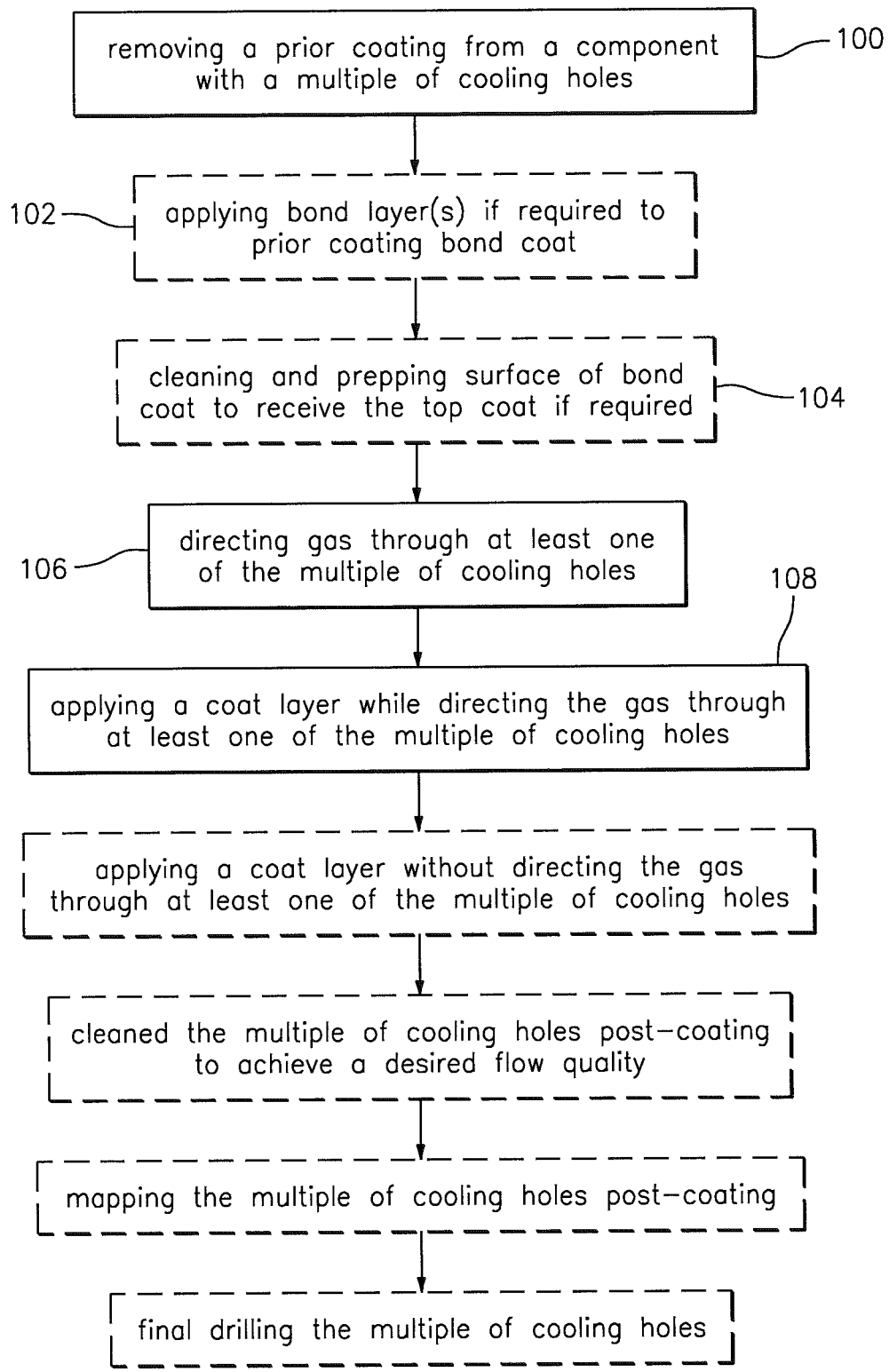
FIG. 9 is a flow diagram of a method of repairing an actively cooled component according to another disclosed non-liming embodiment.
Figure 10:
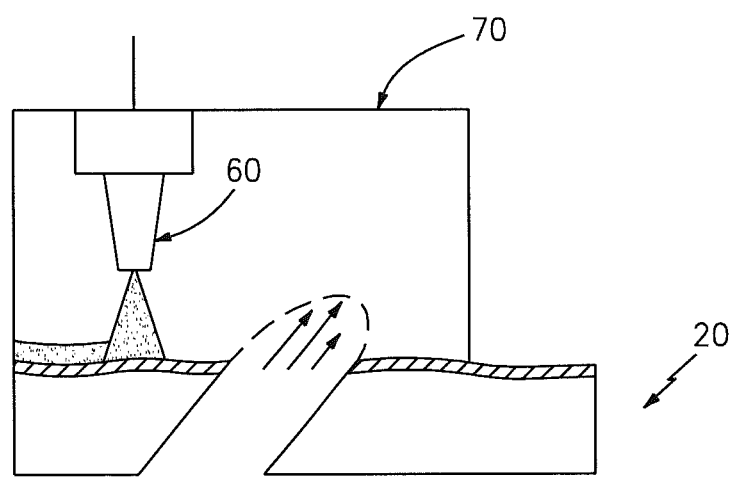
FIG. 10 is an expanded cross section of the actively cooled component representative of one step of the method of repairing an actively cooled component.

With reference to FIG. 9, a method according to another disclosed non-limiting embodiment turns the gas flow through the cooling holes 22 during the coating step off, for example, during initial or final layers of top coat 32 application (step 110). That is, one or more top coat 32 layer applications may be relatively thin and reapplication thereof minimally effects, if at all, the multiple of cooling holes 22. In another disclosed non-limiting embodiment, the spray system 60 is within a vacuum environment 70 (illustrated schematically) which may ride along or is otherwise attached on the coated side of the component 20 and, thus, draws air through the component 20 (FIG. 10).

The cooling holes 22 may then be cleaned and dressed post-coating (step 112) to achieve a desired flow quality, assure that the cooling holes 22 are not filled with extraneous coating matter or to accommodate the wake effect of the gas flow that may change the coating characteristics on the acute angle side of the cooling holes 22. That is, the coating adjacent to the cooling holes 22 is ablated and may require finish drilling.

Figure 11:
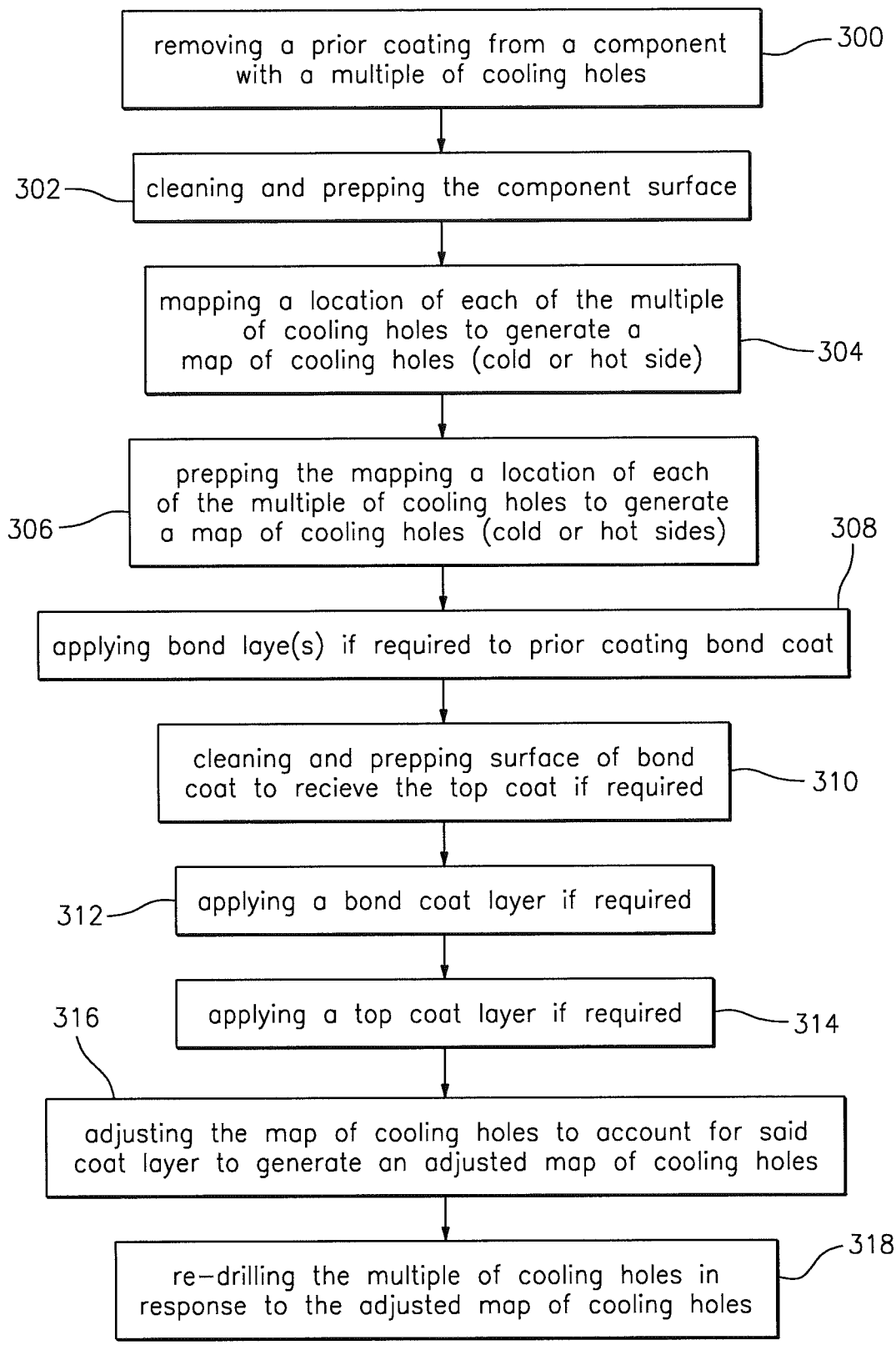
FIG. 11 is a flow diagram of a method of repairing an actively cooled component according to another disclosed non-liming embodiment.

With reference to FIG. 11, in another disclosed non-limiting embodiment, the above-described method may be coupled with mapping or scanning techniques to more precisely identify the cooling holes 22. The repair method for the coating involves stripping the top coat 32 either completely or in the distressed areas D with a water jet, grit blast or other system (Step 300).

The surface may then be cleaned and prepped for the mapping of the cooling holes 22 (Step 302). The prepping for mapping may include treatment of the part surface to facilitate the selected mapping technology (Step 304). For example, the surface to be mapped may be treated with a white coating to increase contrast with the cooling holes 22.

The cooling holes 22 are then mapped to locate the pre-existing cooling holes 22 on the uncoated component 20 (Step 304). The cooling holes 22 may be mapped, scanned or otherwise located with any or combinations of several technologies such as interferometry, optical, laser, digital vision, part probing and/or other methods to generate a map of the cooling holes 22.

The map of cooling holes 22 may then be stored on computer readable storage medium of a computing device. In terms of hardware architecture, such a computing device may include a processor, memory, and one or more input and/or output (I/O) device interface(s) that are communicatively coupled via a local interface. In one non-limiting embodiment, the processor may be any type of known microprocessor with desired performance characteristics, the memory may, for example only, includes UVPROM, EEPROM, FLASH, RAM, ROM, DVD, CD, hard drive, or other computer readable storage medium which stores data as described herein. The interface facilitates communication and may, for example but not limited to, a keyboard, mouse, scanner, microphone, camera, proximity device, etc. Further, the I/O devices may also include output devices, for example but not limited to, a printer, display, etc., in either dedicated hardware circuitry or programmed software routines of computer readable medium capable of execution through a microprocessor based system.

When the computing device is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

In one disclosed non-limiting embodiment, the cooling holes 22 are mapped on the surface that was just stripped of coating (step 300). Such front side mapping may be particularly applicable to components such as turbine airfoils that provide ready access to a hot side. In another disclosed non-limiting embodiment, the cooling holes 22 are mapped on the surface opposite the surface that was stripped of coating (Step 300). Such backside mapping may be particularly applicable to components such as exhaust duct liner assemblies that provide ready access to a cold side. That is, either a cold side or a hot side of the component 22 may be mapped as the cooling holes 22 are through-holes. It should be appreciated that the "hot" side or "front side" is the portion of the component that is exposed to core combustion gases and is also typically the coated side, while the "cold" side is opposite the "hot" side and is typically uncoated and may also be referred to a the "back side".

Next, location features such as predefined holes, etched or machined features that are readily identified post-coat may then be added (Step 308). The location features operate as a reference point to facilitate location of the cooling hole 22 in subsequent steps.

After mapping, additional preparation of the component 20 may be performed (Step 310). The preparation includes but is not limited to, cleaning masking or otherwise that which facilitates recoat of the—partial or full—bond coat 30 and the top coat 32.

Next, the component 20 is recoated with bond coat 30, if necessary, to bring the thickness of the bond coat 30 to original or near-original specification (Step 312). The top coat 32 is then reapplied to the original or near-original specifications (Step 314). The top coat 32 may be applied either with or without the gas being directed through at least one of the multiple of cooling holes 22 as discussed above.

The computing device includes an algorithm that utilizes the map of cooling holes from Step 300 and compensates for the thickness of the bond coat 30 and top coat 32, deformation from the coating process and/or other factors to generate an adjusted map of cooling holes. This algorithm may leverage the aforementioned locating feature (Step 308).

The cooling holes 22 are then restored via drilling or other procedure on the recoated component 20 in response to the adjusted map of cooling holes (Step 316). That is, the algorithm accounts for the thickness of the bond coat 30 and top coat 32, deformation from the coating process and/or other factors. The algorithm may thereby provide an offset between the map of cooling holes and the adjusted map of cooling holes. It should be appreciated by those skilled in the art with the benefit of this disclosure that these functions may be enacted in either dedicated hardware circuitry or computer readable medium containing programming instructions capable of execution in a microprocessor based computing device.

The computing device thereby generates the updated cooling hole location coordinates which accommodates any shift caused by the coat thickness and thereby allows the cooling holes to be accurately re-drilled. That is, the holes are re-drilled approximately at every pre-existing cooling hole location such that at least some of the re-drilled cooling hole is coincident with the pre-existing cooling hole.

Furthermore, the above-described method may be utilized in the original equipment process as well where the disclosed process forms the hole geometry through a newly applied coating in place of laser, Electron Discharge Machining (EDM), waterjet or other drilling processes. In this non-limiting embodiment, the substrate requires pre-drilled holes that are continued through the coating or from the backside thereof during operation of the above-described methodology.

It should be appreciated that relative positional terms such as "forward," "aft," "upper," "lower," "above," "below," and the like are with reference to the engine but should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

Although particular step sequences are shown, described, and claimed, it should be appreciated that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A method of coating a component having a multiple of cooling holes, the method comprising:

removing at least a portion of a prior coating from the component; mapping a location of each of the multiple of cooling holes to generate a map of cooling holes;

subsequent to said mapping, applying a coat to the component;

subsequent to applying the coat to the component, adjusting the map of cooling holes using said mapping to account for said coat to generate, by a computing device that includes an algorithm, an adjusted map of cooling holes, where the using of said mapping by the algorithm to generate the adjusted map of cooling holes is based on a thickness of the coat and deformation from applying the coat; and drilling the multiple of cooling holes in response to the adjusted map of cooling holes, wherein the mapping is performed by at least two techniques selected from the group consisting of: interferometry, optical scanning, laser scanning, digital vision, and part probing.

* * * * *